Dec. 27, 1955     G. R. BLACKMAN     2,728,551
PLUG VALVE AND SEALING MEANS THEREFOR
Filed Aug. 27, 1951
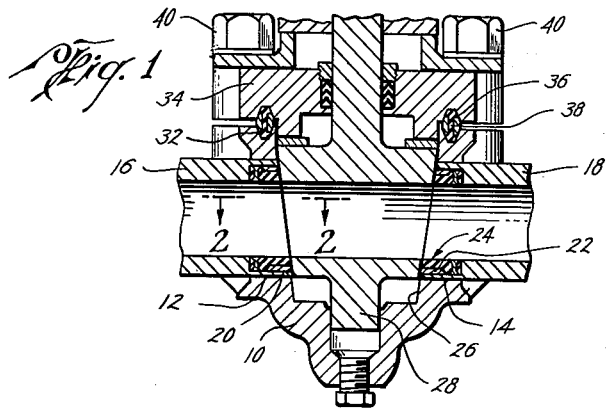
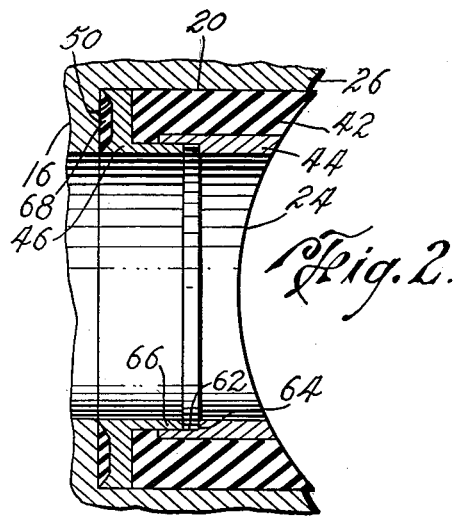
Glenn R. Blackman
INVENTOR.
BY
Charles E. Lightfoot
ATTORNEY

United States Patent Office 2,728,551
Patented Dec. 27, 1955

2,728,551

PLUG VALVE AND SEALING MEANS THEREFOR

Glenn R. Blackman, Houston, Tex.

Application August 27, 1951, Serial No. 243,849

2 Claims. (Cl. 251—317)

This invention relates to a plug valve and sealing means therefor, and more particularly to a plug valve of the type employing a tapered valve seat within which a tapered valve plug is disposed, and sealing means for forming a fluid tight seal between the seat and the plug.

The invention has for its chief object the provision of a plug valve structure wherein means is employed for forming a fluid tight seal between the tapering surfaces of the valve seat and plug, under all conditions of operation of the valve.

Another object of the invention is the provision of resilient sealing means for forming a fluid tight seal between a valve seat and a valve plug, which sealing means possesses improved sealing and wear resisting qualities.

A further object of the invention is to provide a plug valve structure having a valve seat formed with annular recesses surrounding the flowway of the valve, and sealing means seated in the recesses and engageable with the valve plug and adapted to be forced into sealing engagement with the plug and seat by movement of the plug toward the seat.

A still further object of the invention is to provide a sealing means for plug valves or the like, which means includes a relatively deformable packing element, adapted to be forced into fluid tight engagement between the valve seat and plug, by movement of the plug toward the seat, and having means for retaining the packing in position in the valve, and protecting the same against excessive wear or displacement due to high fluid pressure to which the valve may be subjected.

The above and other objects and advantages of the invention will best be understood from the following detailed description, constituting a specification of the same, when considered in conjunction with the annexed drawings, wherein—

Figure 1 is a vertical, central, cross-sectional view of a plug valve structure, showing the invention applied thereto; and Figure 2 is a cross-sectional view, taken along the line 2—2 of Figure 1, looking in the direction indicated by the arrows, and showing the structural details of the sealing means of the valve.

Referring now to the drawings in greater detail, the numeral 10 indicates the casing of a plug valve, having opposite openings 12 and 14, respectively, within which extend the tubular members 16 and 18, respectively. The members 16 and 18 may be secured to the casing in any convenient manner, as by welding, or otherwise, and these members are formed at their inner ends with counter bores 20 and 22 providing annular recesses adapted to receive seal rings 24, hereinafter described.

The casing has an inner downwardly tapering bore 26 between the openings 12 and 14, forming a valve seat into which a rotatable plug 28 is fitted, which plug has a flowway 30 therethrough. The plug 28 is engaged by the seal rings 24, 24, to form a fluid tight seal between the plug and the casing.

The valve plug 28 is adapted to be moved upwardly out of seating position in the bore 26 and then rotated to align the flowway 30 with the inlet and outlet openings of the valve casing in order to open the valve, and to be rotated to move the flowway out of alignment with the inlet and outlet openings and then moved downwardly to seating position in order to close the valve. By such construction the valve plug is not rotated in engagement with its seat, thus greatly increasing the life of the sealing means employed.

At its upper end the casing is formed with an annular groove 32, and a bonnet 34 is positioned on the top of the casing, which bonnet has an annular groove 36 in its lower surface opposite the groove 32 in the casing. A seal ring 38, forms a fluid tight seal between the casing and the bonnet, the bonnet being suitably secured to the valve casing in any convenient manner, as by means of bolts, indicated at 40, 40.

As illustrated in detail in Figure 2 of the drawings the sealing member 24, has a resilient packing element 42 whose outer diameter is of a size to fit snugly within the counterbore, 20, and is provided on its inner circumference with a retainer member 44. The retainer member 44 has an outer end surface which is co-extensive with the outer end surface of the packing element, and terminates at its inner end in outwardly spaced relation to the inner end of the sealing member. The retainer also has a counter bore 62 in its outer end, providing an internal annular shoulder 64, and the sealing member has a back-up ring 46 formed with an annular flange 66, which fits into the counter bore 62 of the retainer. The back-up ring is formed with an annular tapered groove 50 opening toward the bottom of the counter bore 20, within which packing material 68 is disposed, for sealing engagement with the bottom of the counter bore.

The sealing members 24, 24 are seated in the counterbores 20 and 22 with their inner ends projecting slightly into the bore 26 of the valve casing into engagement with the valve plug. The valve plug exerts a compressive force on the sealing members, forcing the same into the counterbores 20, and 22 so that the retainers 44 are moved toward the back-up rings 46 to force the resilient packing elements 42 into fluid tight sealing engagement between the plug and the casing. At the same time the back-up rings are urged toward the bottoms of the counterbores to bring the packing material 68 into sealing engagement therewith, so that leakage of fluid between the sealing members and the tubular connecting members 16 and 18 is prevented.

The invention, as described above, provides a valve structure of simple design, in which sealing elements are carried in the valve seat for engagement with the valve plug about the flow-way therein, and by which a fluid tight seal is assured between the valve plug and the valve casing, so that any possibility of leakage due to imperfect seating of the plug in the casing is effectively prevented.

The invention has been described in connection with a certain specific embodiment of the same, but it will be understood that this is intended by way of illustration only, and that numerous changes in the construction and arrangement of the various parts can be made, without departing from the spirit of the invention or the scope of the appended claims.

Having thus clearly shown and described the invention, what is claimed as new and desired to secure by Letters Patent is—

1. In a valve of the plug type having a casing formed with a tapered bore forming a valve seat and inlet and outlet openings communicating with the bore, and a plug whose external surface is shaped to conform to the taper of the bore rotatably mounted in the bore and movable longitudinally therein toward and away from said seat, said plug also having a flowway adapted to be moved into and out of communication with said openings, said casing having a recess surrounding each of said openings, a sealing member in each recess, shaped to fit the recess and extending into said bore, said member comprising an annular packing element, an annular retainer positioned in said member in contact with the inner wall of the member, said element and retainer being shaped at the inner end of said member to fit the contour of said plug and engageable therewith upon movement of the plug toward the seat to urge the retainer inwardly of the recess, said retainer terminating at its inner end in spaced relation to the bottom of said recess, and means interengageable with said element and said retainer to expand said element into sealing engagement with said plug upon engagement of the plug with the inner end of said member.

2. In a valve of the plug type having a casing formed with a tapered bore forming a valve seat and inlet and outlet openings communicating with the bore, and a plug whose external surface is shaped to conform to the taper of the bore rotatably mounted in the bore and movable longitudinally therein toward and away from the seat, said plug also having a flowway adapted to be moved into and out of communication with said openings, said casing having an annular recess surrounding each of said openings, a sealing member in each recess shaped to fit the recess, and extending into said bore, said member comprising a packing element of resilient material, an annular retainer in said element in contact with the inner wall of the element, said retainer and element being shaped at their inner ends to fit the contour of said plug and engageable therewith upon movement of the plug toward the seat to urge the retainer inwardly of the recess, said retainer terminating in spaced relation to the bottom of said recess, and a back-up ring disposed between said retainer and the bottom of said recess and cooperable with said retainer upon engagement of said plug with the inner end of said member to expand said element into sealing engagement with the plug.

References Cited in the file of this patent

UNITED STATES PATENTS

| | | |
|---|---|---|
| 2,466,098 | Grebmeier | Apr. 5, 1949 |
| 2,480,529 | Waag | Aug. 30, 1949 |
| 2,520,288 | Shand | Aug. 29, 1950 |
| 2,529,412 | Parker | Nov. 7, 1950 |
| 2,534,477 | Prout | Dec. 19, 1950 |
| 2,574,428 | Wheatley | Nov. 6, 1951 |
| 2,599,774 | Ohls | June 10, 1952 |
| 2,605,994 | Borchardt | Aug. 5, 1952 |

FOREIGN PATENTS

| | | |
|---|---|---|
| 218,861 | Great Britain | 1924 |